(12) United States Patent
Lee et al.

(10) Patent No.: US 11,881,220 B2
(45) Date of Patent: Jan. 23, 2024

(54) DISPLAY DEVICE FOR PROVIDING SPEECH RECOGNITION SERVICE AND METHOD OF OPERATION THEREOF

(71) Applicant: LG ELECTRONICS INC., Seoul (KR)

(72) Inventors: Hyangjin Lee, Seoul (KR); Jaekyung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 147 days.

(21) Appl. No.: 17/610,201

(22) PCT Filed: May 15, 2019

(86) PCT No.: PCT/KR2019/005808
§ 371 (c)(1),
(2) Date: Nov. 10, 2021

(87) PCT Pub. No.: WO2020/230923
PCT Pub. Date: Nov. 19, 2020

(65) Prior Publication Data
US 2022/0223151 A1 Jul. 14, 2022

(51) Int. Cl.
*G10L 15/22* (2006.01)
*G06F 3/14* (2006.01)
(Continued)

(52) U.S. Cl.
CPC .............. *G10L 15/22* (2013.01); *G06F 3/14* (2013.01); *G10L 15/1815* (2013.01);
(Continued)

(58) Field of Classification Search
USPC ...................................... 704/1–504
See application file for complete search history.

(56) References Cited

U.S. PATENT DOCUMENTS 7,426,467 B2 * 9/2008 Nashida ............. H04N 21/4828
725/38
10,586,536 B2 * 3/2020 Jeong ..................... G06F 3/167
(Continued)

FOREIGN PATENT DOCUMENTS

| EP | 3 190 512 A1 | 7/2017 |
| EP | 3 522 509 A1 | 8/2019 |

(Continued)

OTHER PUBLICATIONS

International Search Report (PCT/ISA/210) issued in PCT/KR2019/005808, dated Feb. 18, 2020.

*Primary Examiner* — Marcus T Riley
(74) *Attorney, Agent, or Firm* — Birch, Stewart, Kolasch & Birch, LLP

(57) ABSTRACT

A display device for providing a speech recognition service according to an embodiment of the present disclosure can include a display unit, a network interface unit configured to communicate with a server, and a control unit configured to receive a voice command uttered by a user, acquire usage information of the display device, transmit the voice command and the usage information of the display device to the server through the network interface unit, receive, from the server, an utterance intention based on the voice command and the usage information of the display device, and perform an operation corresponding to the received utterance intention.

15 Claims, 11 Drawing Sheets

(51) Int. Cl.
  *G10L 15/18* (2013.01)
  *G10L 15/30* (2013.01)
  *H04N 21/422* (2011.01)
  *H04N 21/438* (2011.01)

(52) U.S. Cl.
  CPC ....... *G10L 15/30* (2013.01); *H04N 21/42203* (2013.01); *H04N 21/4383* (2013.01); *G10L 2015/223* (2013.01)

(56) References Cited

U.S. PATENT DOCUMENTS

| | | | |
|---|---|---|---|
| 10,679,618 B2* | 6/2020 | Sohn | H04N 21/4131 |
| 11,069,143 B2* | 7/2021 | Kim | G06F 3/04815 |
| 11,240,361 B2* | 2/2022 | Han | G06F 3/0482 |
| 11,250,869 B2* | 2/2022 | Maeng | G06V 40/16 |
| 11,521,621 B2* | 12/2022 | Yang | G10L 17/04 |
| 2014/0070925 A1 | 3/2014 | Shin et al. | |
| 2014/0195249 A1* | 7/2014 | Chung | G10L 21/06 704/275 |
| 2015/0106099 A1 | 4/2015 | Choi et al. | |
| 2015/0134333 A1 | 5/2015 | Sim et al. | |
| 2017/0256260 A1* | 9/2017 | Jeong | G06F 3/16 |
| 2018/0039478 A1* | 2/2018 | Sung | G10L 15/1815 |
| 2018/0122379 A1* | 5/2018 | Sohn | G10L 17/22 |
| 2019/0012137 A1* | 1/2019 | Lim | G06F 3/01 |
| 2019/0385376 A1* | 12/2019 | Kim | G06F 3/0482 |
| 2020/0005145 A1* | 1/2020 | Kim | G06N 3/08 |
| 2020/0068059 A1 | 2/2020 | Hwang et al. | |
| 2020/0220984 A1 | 7/2020 | Hwang et al. | |
| 2020/0314230 A1* | 10/2020 | Han | G06F 9/44 |
| 2021/0134301 A1* | 5/2021 | Yang | G10L 15/075 |
| 2021/0327447 A1* | 10/2021 | Maeng | H04R 1/406 |
| 2022/0223151 A1* | 7/2022 | Lee | G10L 15/30 |

FOREIGN PATENT DOCUMENTS

| | | |
|---|---|---|
| KR | 10-2014-0033654 A | 3/2014 |
| KR | 10-2015-0043807 A | 4/2015 |
| KR | 10-2015-0054490 A | 5/2015 |
| WO | WO 2018/082975 A1 | 5/2018 |

* cited by examiner

DISPLAY DEVICE FOR PROVIDING SPEECH RECOGNITION SERVICE AND METHOD OF OPERATION THEREOF

CROSS REFERENCE TO RELATED APPLICATIONS

This application is the National Phase of PCT International Application No. PCT/KR2019/005808, filed on May 15, 2019, all of which is hereby expressly incorporated by reference into the present application.

TECHNICAL FIELD

The present disclosure relates to a display device capable of providing a speech recognition service and a method of operation thereof.

BACKGROUND ART

Digital TV services using wired or wireless communication networks are becoming common. Digital TV services are capable of providing various services that could not be provided by the existing analog broadcasting services.

For example, Internet Protocol Television (IPTV) and smart TV services, which are types of digital TV services, provide interactivity so that users can actively select the types of watching programs, the watching time, and the like. The IPTV and smart TV services can provide various additional services, such as Internet search, home shopping, and online games, based on such interactivity.

In addition, recent TVs provide a speech recognition service that recognizes a speech uttered by a user and performs a function corresponding to the speech.

However, the existing speech recognition service does not take into account the usage environment of the display device, and merely determines the intention of a voice command uttered by a user and provides a function corresponding thereto.

That is, there is a limitation that the speech recognition service depends only on the user's utterance.

DISCLOSURE OF INVENTION

Technical Problem

The present disclosure aims to provide a display device capable of performing an operation according to a user's utterance intention in consideration of use information of the display device in real time.

Technical Solution

A display device for providing a speech recognition service according to an embodiment of the present disclosure can include a display unit, a network interface unit configured to communicate with a server, and a control unit configured to receive a voice command uttered by a user, acquire usage information of the display device, transmit the voice command and the usage information of the display device to the server through the network interface unit, receive, from the server, an utterance intention based on the voice command and the usage information of the display device, and perform an operation corresponding to the received utterance intention.

A method of operating a display device for providing a speech recognition service according to an embodiment of the present disclosure can include receiving a voice command uttered by a user, acquiring usage information of the display device, transmitting the voice command and the usage information of the display device to a server, receiving, from the server, an utterance intention based on the voice command and the usage information of the display device, and performing an operation corresponding to the received speech intention.

Advantageous Effects

According to various embodiments of the present disclosure, a speech recognition service may be provided by recognizing a user's voice command in accordance with a dynamically changing usage environment of a display device. Therefore, a user's voice command convenience may be greatly improved.

In addition, according to an embodiment of the present disclosure, a function of switching an external input frequently used by a user can be performed only by a simple utterance, thereby improving convenience of a voice command.

In addition, according to an embodiment of the present disclosure, since there is no need to build a separate dictionary in a server for recognizing all information that is generated and deleted in real time, the load on the server can be reduced.

BEST MODE FOR CARRYING OUT THE INVENTION

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present disclosure, for example, as an artificial display device that adds a computer supporting function to a broadcast receiving function, can have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS can be used.

Accordingly, since various applications are freely added or deleted on a general purpose OS kernel, a display device described herein, for example, can perform various user-friendly functions. The display device, in more detail, can be a network TV, Hybrid Broadcast Broadband TV (HBBTV), smart TV, light-emitting diode (LED) TV, organic light-emitting diode (OLED) TV, and so on and in some cases, can be applied to a smartphone.

Figure 1:
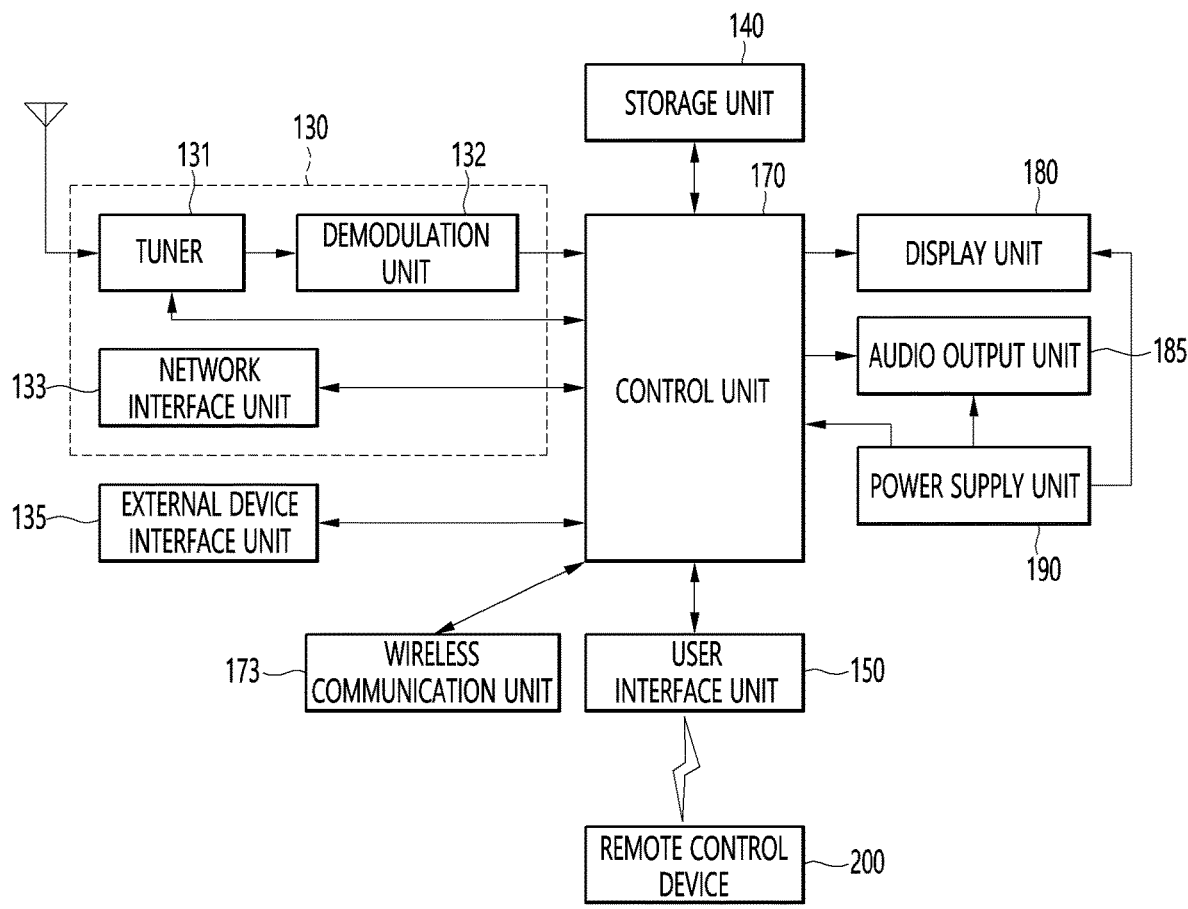
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception unit 130, an external device interface unit 135, a storage unit 140, a user input interface unit 150, a control unit 170, a wireless communication unit 173, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface unit 135 can provide a connection path between the display device 100 and an external device. The external device interface unit 135 can receive at least one an image or audio output from an external device that is wirelessly or wiredly connected to the display device 100 and deliver it to the control unit 170. The external device interface unit 135 can include a plurality of external input terminals. The plurality of external input terminals can include an RGB terminal, at least one High Definition Multimedia Interface (HDMI) terminal, and a component terminal.

An image signal of an external device input through the external device interface unit 135 can be output through the display unit 180. A sound signal of an external device input through the external device interface unit 135 can be output through the audio output unit 185.

An external device connectable to the external device interface unit 135 can be one of a set-top box, a Blu-ray player, a DVD player, a game console, a sound bar, a smartphone, a PC, a USB Memory, and a home theater system, but this is just exemplary.

The network interface unit 133 can provide an interface for connecting the display device 100 to a wired/wireless network including the Internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. That is, the network interface unit 133 can transmit or receive data to or from a corresponding server by accessing a predetermined webpage through the network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an Internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily storing image, voice, or data signals output from the external device interface unit 135 or the network interface unit 133 and can store information on a predetermined image through a channel memory function.

The storage unit 140 can store an application or an application list input from the external device interface unit 135 or the network interface unit 133.

The display device 100 can play content files (for example, video files, still image files, music files, document files, application files, and so on) stored in the storage unit 140 and provide them to a user.

The user input interface unit 150 can deliver signals input by a user to the control unit 170 or deliver signals from the control unit 170 to a user. For example, the user input interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user input interface unit 150 can deliver, to the control unit 170, control signals input from local keys (not shown) such as a power key, a channel key, a volume key, and a setting key.

Image signals that are image-processed in the control unit 170 can be input to the display unit 180 and displayed as an image corresponding to corresponding image signals. Additionally, image signals that are image-processed in the control unit 170 can be input to an external output device through the external device interface unit 135.

Voice signals processed in the control unit 170 can be output to the audio output unit 185. Additionally, voice signals processed in the control unit 170 can be input to an external output device through the external device interface unit 135.

Besides that, the control unit 170 can control overall operations in the display device 100.

Additionally, the control unit 170 can control the display device 100 by a user command or internal program input through the user input interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user input interface unit 150, the control unit 170 can output image signals or voice signals of an external device such as a camera or a camcorder, which are input through the external device interface unit 135, through the display unit 180 or the audio output unit 185.

Moreover, the control unit 170 can control the display unit 180 to display images and control broadcast images input through the tuner 131, external input images input through the external device interface unit 135, images input through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content input from the outside, and the content can be in various formats such as broadcast images, external input images, audio files, still images, accessed web screens, and document files.

Moreover, the wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication unit 173. Accordingly, a user of the wearable device can use the data processed in the display device 100 through the wearable device.

The display unit 180 can convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents input from the image processing device.

In this case, an operating method of a display device according to an embodiment of the present disclosure described below can be performed by one of the display device described with reference to FIG. 1, an image processing device such as the separated set-top box, and a content playback device including the display unit 180 and the audio output unit 185.

Figure 2:
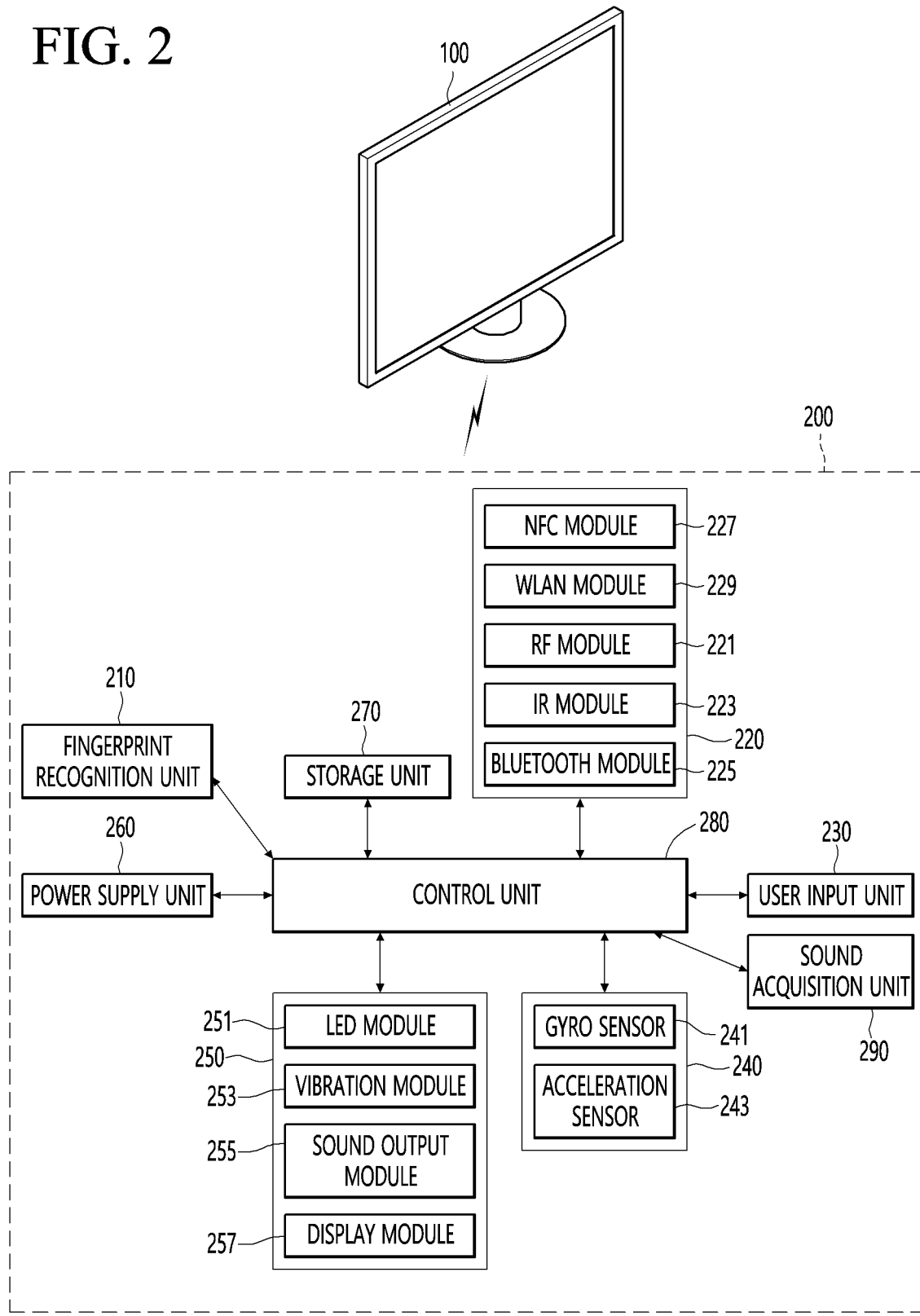
FIG. 2 is a block diagram illustrating a remote control device according to an embodiment of the present disclosure.
Figure 3:
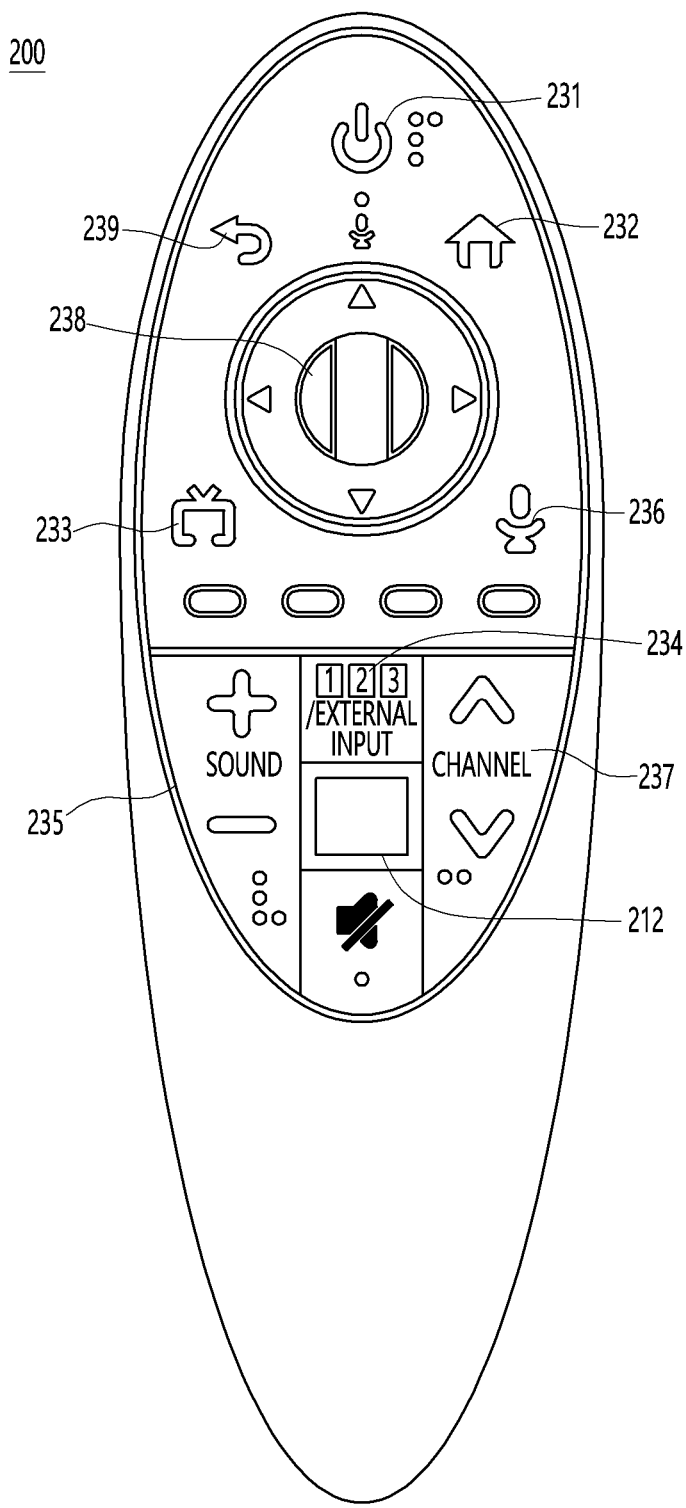
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a sound acquisition unit 290.

Referring to FIG. 2, the wireless communication unit 220 transmits/receives signals to/from an arbitrary any one of display devices according to the above-mentioned embodiments of the present disclosure.

The remote control device 200 can include a radio frequency (RF) module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The home button 232 can be a button for moving to the home screen of the display device 100. The live button 233 can be a button for displaying live broadcast programs. The external input button 234 can be a button for receiving an external input connected to the display device 100. The voice adjustment button 235 can be a button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, referring to FIG. 2, if the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present disclosure.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals in response to manipulation of the user input unit 230 or image or voice signals corresponding to signals transmitted from the display device 100. A user can recognize whether the user input unit 230 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to control of the remote control device 200. The control unit 280 can transmit a signal corresponding to a predetermined key manipulation of the user input unit 230 or a signal corresponding to movement of the remote control device 200 sensed by the sensor unit 240 to the display device 100 through the wireless communication unit 220.

Additionally, the sound acquisition unit 290 of the remote control device 200 can obtain voice.

The sound acquisition unit 290 can include at least one microphone and obtain voice through the microphone 291.

Figure 4:
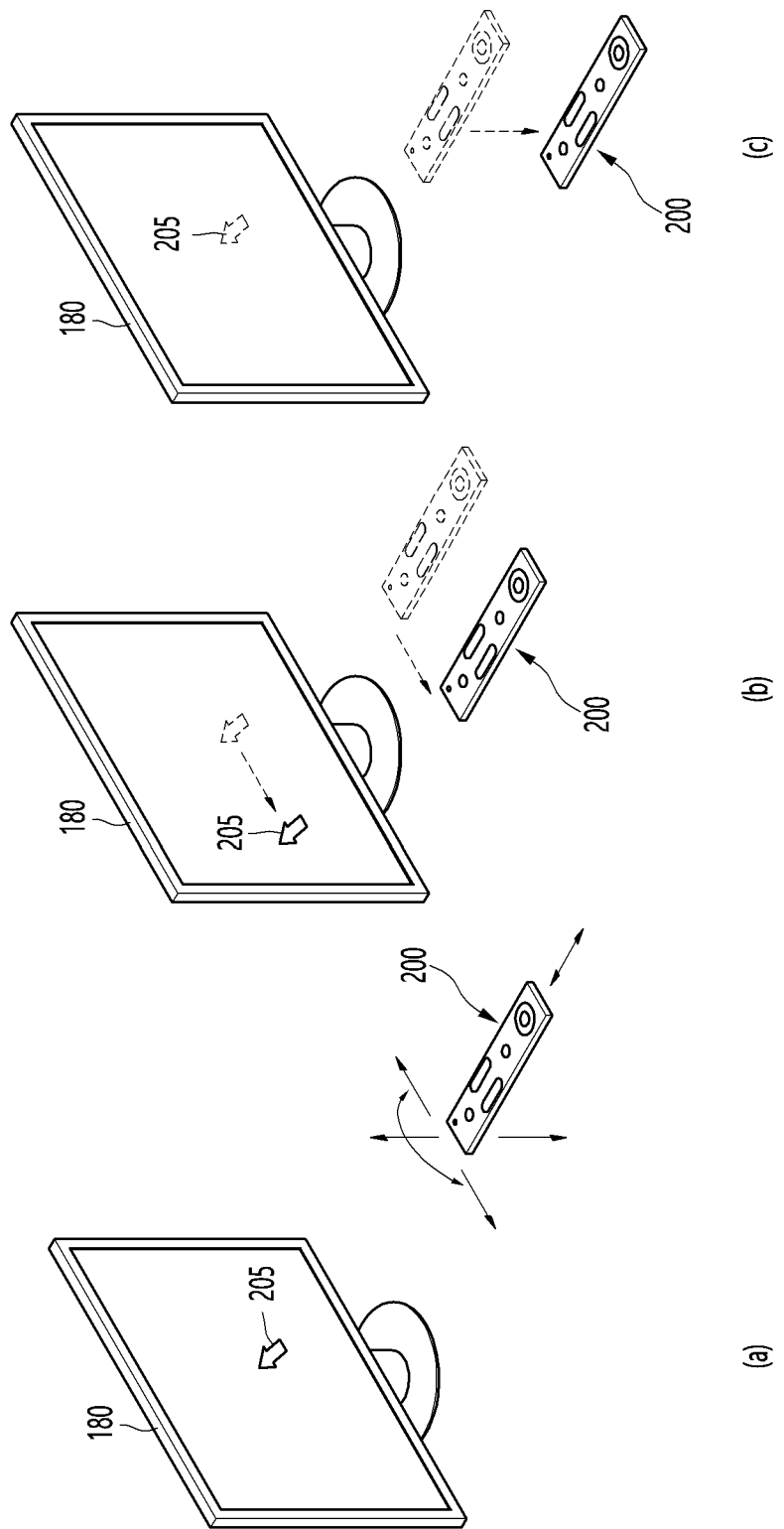
FIG. 4 is a view illustrating an example of utilizing a remote control device according to an embodiment of the present disclosure.

Next, FIG. 4 is described.

FIG. 4 is a view illustrating an example of utilizing a remote control device according to an embodiment of the present disclosure.

FIG. 4(a) illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote control device.

FIG. 4(b) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(c) illustrates that while a specific button in the remote control device 200 is pressed, a user moves the remote control device 200 away from the display unit 180. Thus, a selection area in the display unit 180 corresponding to the pointer 205 can be zoomed in and displayed larger.

On the other hand, if a user moves the remote control device 200 close to the display unit 180, a selection area in the display unit 180 corresponding to the pointer 205 can be zoomed out and displayed in a reduced size.

On the other hand, if the remote control device 200 is moved away from the display unit 180, a selection area can be zoomed out and if the remote control device 200 is moved closer to the display unit 180, a selection area can be zoomed in.

Additionally, if a specific button in the remote control device 200 is pressed, recognition of a vertical or horizontal movement can be excluded. That is, if the remote control device 200 is moved away from or closer to the display unit 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in response to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Figure 5:
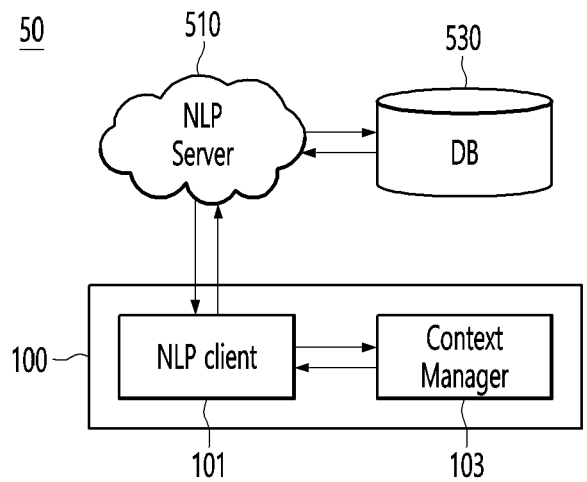
FIG. 5 is a view for describing a configuration of a speech recognition system according to an embodiment of the present disclosure.

FIG. 5 is a view for describing a configuration of a speech recognition system according to an embodiment of the present disclosure.

Referring to FIG. 5, a speech recognition system 50 can include a display device 100, a natural language processing (NLP) server 510, and a database 530.

The display device 100 can transmit, to the NLP server 510, a voice command uttered by a user and usage information of the display device 100.

Although the usage information of the display device 100 will be described later, the usage information of the display device 100 may be information collected from the time when a command for requesting a speech recognition service is received.

The display device 100 may further include the components shown in FIG. 1, and an NLP client 101 and a context manager 103 shown in FIG. 5.

The NLP client 101 can be a communication interface for performing wireless communication with the NLP server 510.

The NLP client 101 can be included in the network interface unit 133 of FIG. 1.

The NLP client 101 can transmit the voice command and the usage information of the display device 100 to the NLP server 510 and can receive, from the NLP server 510, an utterance intention based on the transmitted information.

The context manager 103 can collect the usage information of the display device 100 and can transmit the collected usage information of the display device 100 to the NLP client 101.

The context manager 103 can be included in the control unit 170 of FIG. 1.

The NLP server 510 can analyze the user's utterance intention based on the voice command and the usage information of the display device 100, which are received from the display device 100.

The NLP server 510 can transmit utterance intention information including the analysis result to the NLP client 101 of the display device 100.

The database 530 can store a plurality of pattern commands used to analyze the utterance intention of the voice command.

The database 530 can be included in the NLP server 510.

Figure 6:
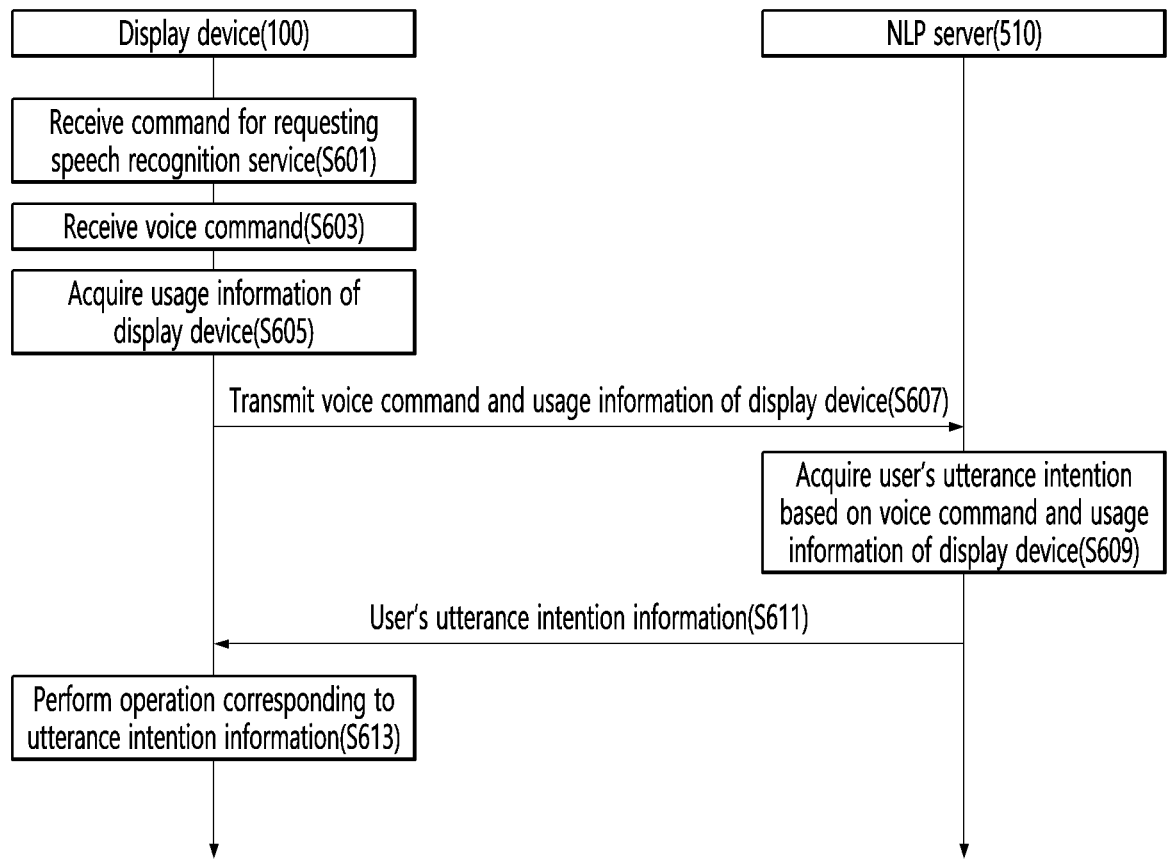
FIG. 6 is a ladder diagram for a method of operating a system according to an embodiment of the present disclosure.

Then, referring to FIG. 6, a method of operating a system according to an embodiment of the present disclosure is described.

FIG. 6 is a ladder diagram for a method of operating a system according to an embodiment of the present disclosure.

Referring to FIG. 6, the control unit 170 of the display device 100 receives a command for requesting a speech recognition service (S601).

In an embodiment, the control unit 170 can receive the command for the speech recognition service from the remote control device 200 through the wireless communication unit 173 or the user input interface unit 150.

The speech recognition service can be a service for recognizing a voice command uttered by a user, determining the intention of the recognized voice command, and performing an operation corresponding to the intention.

The user can select the voice recognition button 236 provided in the remote control device 200. When the voice recognition button 236 is selected, the remote control device 200 can transmit the command for requesting the speech recognition service to the display device 100 through the IR module 223.

As another example, the control unit 170 can receive the command for requesting the speech recognition service through a microphone (not shown) provided in the display device 100.

The control unit 170 can receive an utterance word for providing the speech recognition service, which is input through the microphone, and can prepare to provide the speech recognition service according to the received utterance word.

The control unit 170 of the display device 100 receives a voice command (S603).

The control unit 170 can receive the voice command uttered by the user from the remote control device 200. The sound acquisition unit 290 of the remote control device 200 can receive the voice command uttered by the user, and can transmit sound data corresponding to the received voice command to the display device 100 through the wireless communication unit 220.

The wireless communication unit 220 can be a Bluetooth module, but this is only an example.

The control unit 170 of the display device 100 acquires usage information of the display device 100 (S605).

The usage information of the display device 100 can be information used to provide the speech recognition service in accordance with the intention by determining the intention of the voice command uttered by the user.

The control unit 170 can collect the usage information of the display device 100 from before the time when the command for requesting the speech recognition service is received.

That is, step S605 can be performed before step S601.

The usage information of the display device 100 can include at least one of information on external devices connected through the external device interface unit 135 of the display device 100, information on applications installed on the display device 100, information on the interworking devices linked through the wireless communication unit 173 of the display device 100, or channel information.

The information on the external devices connected through the external device interface unit 135 of the display device 100 can include at least one of the name of the external device, the model name of the external device, or the connection type between the external device interface unit 135 and the external device.

Here, the connection type can be a type indicating through which interface the external device interface unit 135 and the external device are connected, such as an HDMI terminal or an AV terminal.

Here, the external device can be any one of a game console, a set-top box, a DVD player, and a sound bar.

The information on the applications installed on the display device 100 can include the name of the application and the service type provided by the application.

The information on the interworking devices linked through the wireless communication unit 173 of the display device 100 can include the name of the interworking device and the connection type between the interworking device and the wireless communication unit 173.

Here, the connection type between the interworking device and the wireless communication unit 173 may be a type indicating through which communication standard the interworking device is connected.

Configuration channel information can include information on a plurality of channels.

Information on each channel can include at least one of a channel name, a channel code used for channel search, or a channel identifier used for executing a channel.

On the other hand, the usage information of the display device 100 can be collected by the context manager 103 shown in FIG. 1.

The control unit 170 of the display device 100 transmits the voice command and the acquired usage information of the display device 100 to the NLP server 510 (S607).

The control unit 170 can transmit the voice command and the usage information of the display device 100 to the NLP server 510 through the NLP client 101.

The NLP client 101 can be included in the network interface unit 133 shown in FIG. 1.

The NLP server 510 acquires the user's utterance intention based on the voice command and the usage information of the display device 100, which are received from the display device 100 (S609).

The NLP server 510 can acquire the user's utterance intention by using pattern commands stored in the database 530 shown in FIG. 5 and the voice command and the usage information of the display device 100 received from the display device 100.

The NLP server 510 can classify the voice command into an operation intention command and a control intention command.

The operation intention command can be a command used to analyze the user's utterance intention through comparison with the pattern command stored in the database 530.

The control intention command can be a command used to analyze the user's utterance intention by using the usage information of the display device 100.

Figure 7:
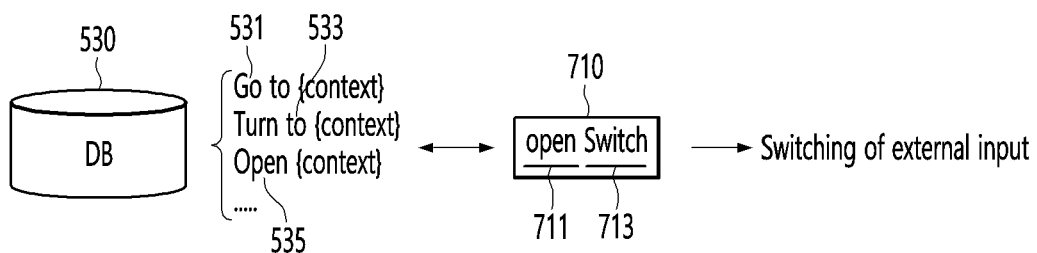
FIGS. 7 to 9 are views for describing a process in which an NLP server analyzes a user's utterance intention by using a voice command and information on a display device, according to an embodiment of the present disclosure.
Figure 8:
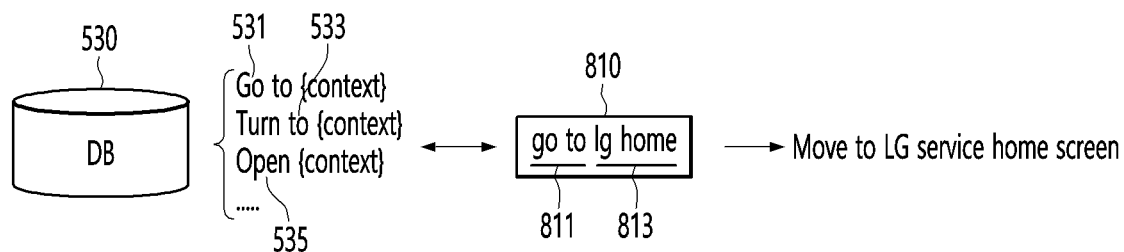
Figure 9:
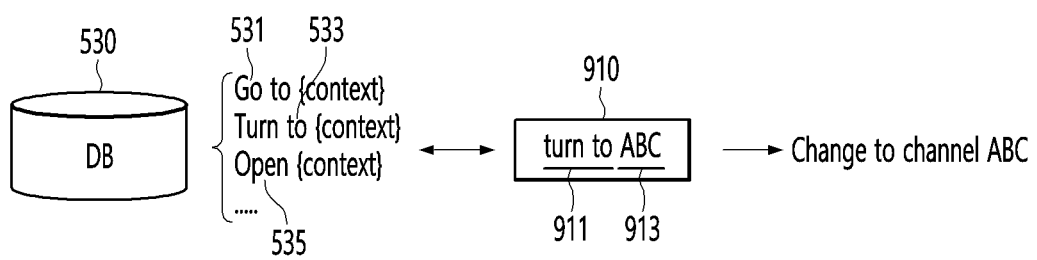

FIGS. 7 to 9 are views for describing a process in which the NLP server analyzes the user's utterance intention by using the voice command and the information on the display device, according to an embodiment of the present disclosure.

First, FIG. 7 is described.

It is assumed in FIG. 7 that the voice command uttered by the user is <Open Switch>.

The NLP server 510 can convert the voice command into a text by using a Speech To Text (STT) engine.

The database 530 can store a plurality of pattern instructions 531 to 535.

Intention information can be matched to each of the plurality of pattern commands 531 to 535.

For example, the first pattern command 531 can be a command indicating a movement of a screen.

The second pattern command 533 can be a command indicating a channel change.

The third pattern command 535 can be a command indicating access to a website or access to an external device connected to the display device 100.

The plurality of pattern commands 531 to 535 can be stored in the database 530 in the form of text.

The NLP server 510 can compare a text 710 corresponding to the voice command transmitted from the display device 100 with the plurality of pattern commands 531 to 535 stored in the database 530.

The NLP server 510 can extract an operation command 711 from the text 710 according to the comparison result. That is, the NLP server 510 can compare the operation command 711 included in the text 710 with the pattern command 535 stored in the database 530, and can acquire the operation command 711 as the pattern command when the operation command 711 matches the pattern command 535.

The NLP server 510 can determine the operation intention indicating access to the website or access to the external device through the operation command 711.

Thereafter, the NLP server 510 can acquire the remaining commands 713 other than the operation command 711 as the control command.

The NLP server 510 can determine the control intention of the control command 713 by using information on the external devices connected through the external device interface unit 135 of the display device 100.

For example, when the text corresponding to the control command is <Switch> 713 and the external device is being connected through the external device interface unit 135, the NLP server 510 can determine the voice command as an intention indicating a switching of an external input to the connected external device.

When the text corresponding to the voice command is <Open game console> and a game console is connected through the external device interface unit 135, the NLP server 510 can determine the voice command as an intention to switch an external input to the game console.

Next, FIG. 8 is described.

It is assumed in FIG. 8 that the voice command uttered by the user is <go to lg home>.

The NLP server 510 can convert the voice command into a text by using an STT engine.

The NLP server 510 can compare the converted text 810 with the plurality of pattern commands 531 to 535 stored in the database 530.

When any one of the plurality of pattern commands 531 to 535 is included in the text 810, the NLP server 510 can acquire the corresponding operation command 811 as the pattern command.

The NLP server 510 can determine the operation intention indicating a movement of a screen through the operation command 811.

The NLP server 510 can acquire the commands 813 other than the operation command 811 as the control command.

The NLP server 510 can determine the intention of the control command based on the usage information of the display device 100.

When a manufacturer <lg> installs an application for providing a service on the display device 100, the NLP server 510 can determine the control command as an intention to select a home screen of the corresponding application as a control target.

The NLP server 510 can acquire the utterance intention of the operation command 811 and the control command 813 as the intention to move to the home screen of the lg service.

Next, FIG. 9 is described.

It is assumed in FIG. 9 that the voice command uttered by the user is <turn to ABC>.

The NLP server 510 can convert the voice command into a text by using an STT engine.

The NLP server 510 can compare the converted text 910 with the plurality of pattern commands 531 to 535 stored in the database 530.

When any one of the plurality of pattern commands 531 to 535 is included in the text 910, the NLP server 510 can acquire the corresponding operation command 911 as the pattern command.

The NLP server 510 can determine the operation intention indicating a channel change through the operation command 911.

The NLP server 510 can acquire the commands 913 other than the operation command 911 as the control command.

The NLP server 510 can determine the intention of the control command based on the channel information of the display device 100.

When the control command <ABC> 913 is a channel name included in the channel information of the display device 100, the NLP server 510 can determine the control command 913 as an intention to select the corresponding channel.

The NLP server 510 can acquire the utterance intention of the operation command 911 and the control command 913 as an intention to tune to a channel named <ABC>.

On the other hand, the database 530 can store only some pattern commands without having to store numerous commands for recognizing the intention of the user's voice command. Therefore, since there is no need to build a separate dictionary, the load on the NLP server 510 can be reduced.

On the other hand, although an example of receiving the user's utterance intention through the NLP server 510 has been described above, the present disclosure is not limited thereto, and the display device 100 can directly determine the utterance intention.

To this end, the display device 100 can include an NLP engine that performs the same function as the NLP server 510, and can acquire the utterance intention corresponding to the user's voice command by using the NLP engine.

The NLP server 510 transmits utterance intention information including the analysis result of the acquired user's utterance intention to the display device 100 (S611).

The NLP server 510 can transmit, to the display device 100, the utterance intention information including the utterance intention analysis result corresponding to the user's voice command in the form of text.

The control unit 170 of the display device 100 performs an operation corresponding to the utterance intention information received from the NLP server 510 (S613).

The control unit 170 can control the operation of the display device 100 so that the display device 100 performs the operation corresponding to the utterance intention information received from the NLP server 510.

For example, when the utterance intention corresponding to the user's voice command indicates the switch of the external input, the control unit 170 can switch the external input to an external device connected through the external device interface unit 135. Therefore, the control unit 170 can output at least one of video or audio input from the external device.

As still another example, when the utterance intention corresponding to the user's voice command indicates the execution of the application installed on the display device 100, the control unit 170 can display an execution screen of the corresponding application on the display unit 180.

As still another example, when the utterance intention corresponding to the user's voice command indicates the interworking with the external device connected through the wireless communication unit 173 of the display device 100, the control unit 170 can output video or audio received from the external device.

In this case, the control unit 170 can perform a screen mirroring function for displaying the same video as that displayed by the external device or can perform an audio mirroring function for outputting the same audio as that output by the external device.

As still another example, when the utterance intention corresponding to the user's voice command indicates the channel change, the control unit 170 can switch to a channel having a channel name corresponding to the voice command.

Figure 10:
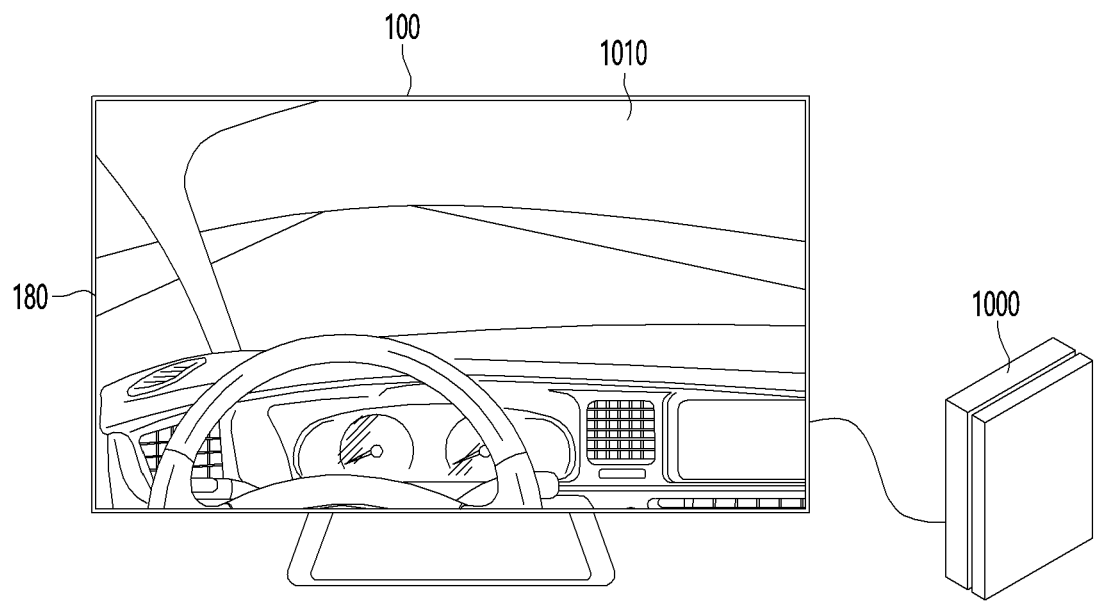
FIGS. 10 to 12 are views for describing scenarios in which an operation corresponding to a user's voice command is performed based on usage information of a display device according to various embodiments of the present disclosure.
Figure 10:
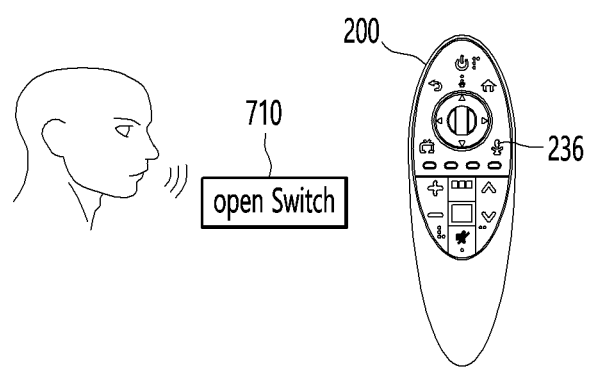
Figure 11:
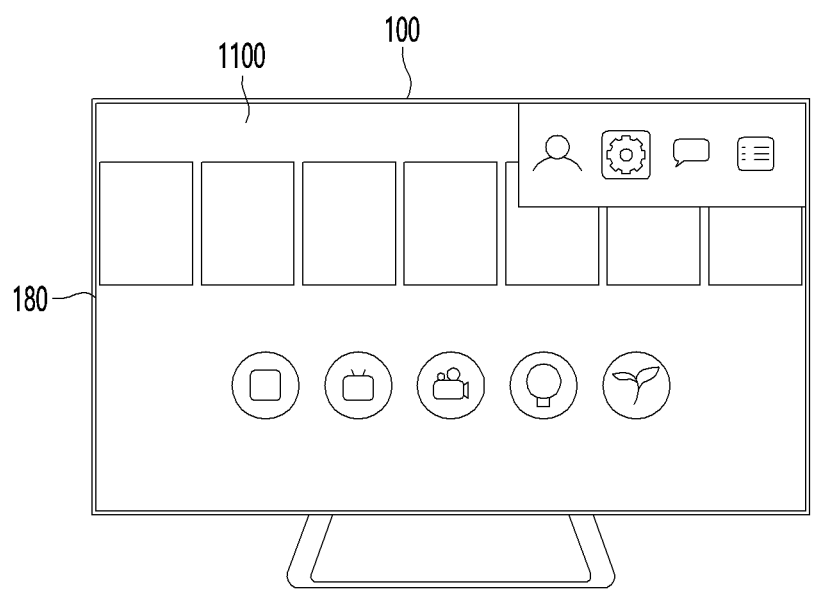
Figure 11:
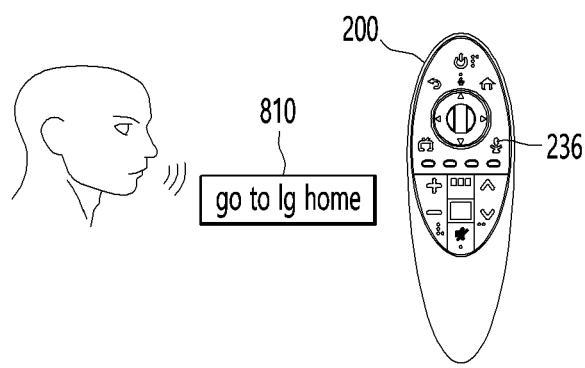
Figure 12:
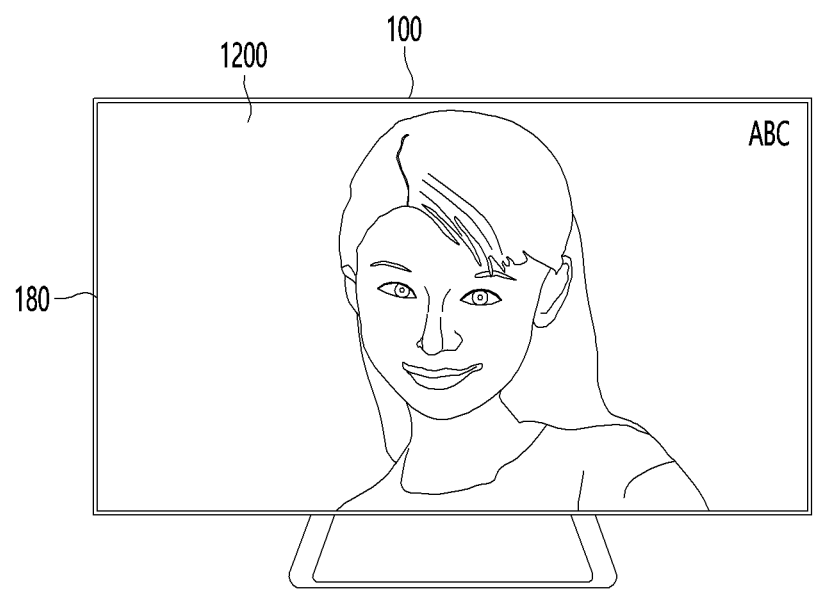
Figure 12:
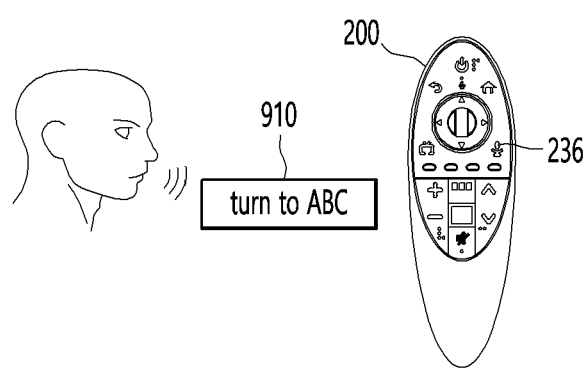

FIGS. 10 to 12 are views for describing scenarios in which an operation corresponding to a user's voice command is performed based on usage information of a display device according to various embodiments of the present disclosure.

In FIGS. 10 to 12, a user can select the voice recognition button 236 provided in the remote control device 200 and receive a speech recognition service.

When the voice recognition button 236 provided in the remote control device 200 is selected, the control unit 170 can receive a command for requesting a speech recognition service from the remote control device 200.

After receiving the command for requesting the speech recognition service, the control unit 170 can collect the usage information of the display device 100.

First, FIG. 10 is described.

FIG. 10 will be described on the assumption that a game console 1000 is connected to the external device interface unit 135 of the display device 100 and a user utters a voice command <open switch> 710.

The remote control device 200 can receive the voice command 710 and transmit the received voice command 710 to the display device 100.

The display device 100 can acquire the utterance intention of the voice command 710. The process of acquiring the utterance intention is the same as described with reference to FIG. 7.

When the acquired utterance intention is the input switch to the external device connected through the external device interface unit 135, the control unit 170 can display a game image 1010 received from the game console 1000 on the display unit 180.

Next, FIG. 11 is described.

FIG. 11 will be described on the assumption that the application providing the services of the manufacturer lg is installed on the display device 100 and a user utters a voice command <go to lg home> 810.

The remote control device 200 can receive the voice command 810 and transmit the received voice command 810 to the display device 100.

The display device 100 can acquire the utterance intention of the voice command 810 in the same way as shown in FIG. 8.

When the acquired utterance intention is the execution of the application installed on the display device 100, the control unit 170 can display an execution screen 1100 of the corresponding application on the display unit 180.

Next, FIG. 12 is described.

FIG. 12 will be described on the assumption that the display device 100 displays a broadcast channel image and a user utters a voice command <turn to ABC> 910.

The remote control device 200 can receive the voice command 910 and transmit the received voice command 910 to the display device 100.

When the acquired utterance intention indicates a change to a channel having a channel name of <ABC>, the control unit 170 can change the current channel to the channel having the channel name of <ABC>. As will be described later, according to an embodiment of the present disclosure, channel switching can be supported even for a channel in which a channel code does not exist.

According to various embodiments of the present disclosure, a speech recognition service can be provided by recognizing a user's voice command in accordance with the dynamically changing usage environment of the display device 100.

Therefore, a user's voice command convenience may be greatly improved.

According to an embodiment of the present disclosure, even when the channel code of the channel is <unknown>, channel switching can be performed according to the user's voice command.

Figure 13:
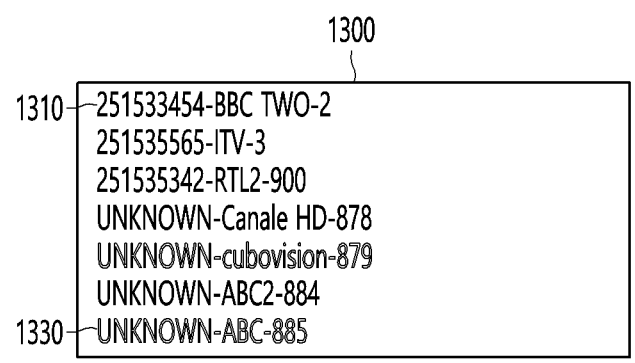
FIGS. 13 to 15 are views for describing that even a channel in which a channel code does not exist can be switched to a corresponding channel according to a voice command according to an embodiment of the present disclosure.
Figure 14:
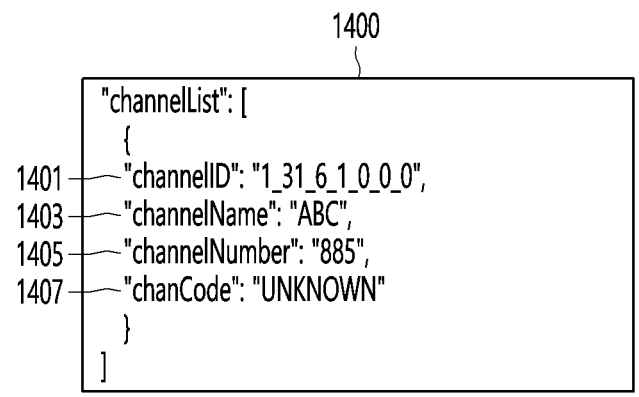
Figure 15:
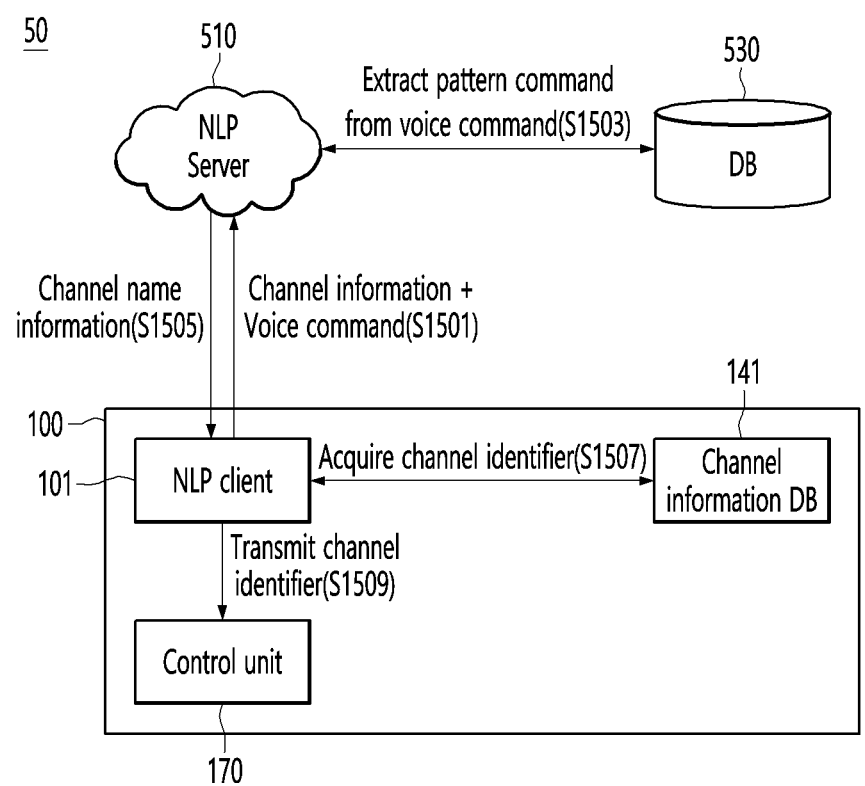

FIGS. 13 to 15 are views for describing that even a channel in which a channel code does not exist can be switched to a corresponding channel according to a voice command according to an embodiment of the present disclosure.

First, referring to FIG. 13, a channel list 1300 stored in the storage unit 140 of the display device 100 is illustrated.

The channel list 1300 can include information on a plurality of channels.

The information on each of the channels can include at least one of a channel code, a channel name, a channel number, or a channel identifier.

The channel code can be a code used to search for a channel.

The channel identifier can be an identifier that identifies a channel used to execute (or tune) the corresponding channel.

For example, a first channel item 1310 can include information on the first channel.

Information on the first channel can include a channel code (251533454), a channel name (BBC TWO), and a channel number (2).

A second channel item 1330 can include information on the second channel.

The information on the second channel can include a channel name (ABC) and a channel number 885, but cannot include a channel code (unknown).

FIG. 14 is a view illustrating detailed information 1400 on the second channel item 1330.

The detailed information is shown for values of a channel identifier 1401, a channel name 1403, a channel number 1405, and a channel code 1407.

Next, FIG. 15 is described.

FIG. 15 is a view for describing a process of switching to a corresponding channel when the display device 100 receives a voice command including a channel name in which a channel code does not exist.

FIG. 15 will be described on the assumption that the user's voice command is <turn to ABC>.

First, the NLP client 101 of the display device 100 can transmit channel information and a user's voice command to the NLP server 510 (S1501).

The channel information can include a channel name, a channel code (unknown), a channel identifier, and a channel number.

The NLP server 510 can extract a pattern command (turn to, operation command) from the voice command by using the pattern commands stored in the database 530 (S1503).

The NLP server 510 can acquire a control command (ABC) based on the channel information. Here, the control command is a command indicating the channel name.

The NLP server 510 can acquire that the utterance intention of the voice command is to switch to the ABC channel.

The NLP server 510 can transmit the utterance intent including the channel name information to the NLP client 101 (S1505).

The NLP client 101 can acquire a channel identifier based on the received channel name information (S1507). The NLP client 101 can extract a channel identifier corresponding to the channel name ABC from a channel information DB 141 included in the storage unit 140.

The NLP client 101 can transmit the extracted channel identifier to the control unit 170 (S1509).

The control unit 170 can tune to a channel corresponding to the channel identifier by using the received channel identifier.

As such, according to an embodiment of the present disclosure, even when the channel code is unknown, switching to the corresponding channel can be supported by using the voice command including the channel name.

That is, even in countries supporting an online electronic program guide, there are cases in which the channel code is <unknown>. Even in this case, switching to the corresponding channel can be supported through the voice command.

On the other hand, according to another embodiment of the present disclosure, the operation of the display device 100 can be performed through the utterance word previously designated by the user.

For example, when the voice command <switch> is set to correspond to an external input switching function, the display device 100 can perform external input switching according to reception of the voice command <switch>.

As another example, an utterance word including the name of an external input device can be supported. Specifically, when the voice command <switch game console> is set to correspond to the function of switching to a game console connected through an external input, the display device 100 can switch to the external input connected to the game console according to the reception of the voice command <switch game console>.

As another example, utterance words including the name of the external input type of the external device interface unit 135 can be supported. Specifically, in the case in which the external device interface unit 135 includes a plurality of HDMI terminals, when HDMI 1 or HDMI 2 is received as the voice command, the display device 100 may switch an external input to an external device connected to the corresponding HDMI terminal.

According to an embodiment of the present disclosure, the above-described method can be implemented with codes readable by a processor on a medium in which a program is recorded. Examples of the medium readable by the processor include a ROM, a RAM, a CD-ROM, a magnetic tape, a floppy disk, an optical data storage device, and the like, and can include those implemented in the form of carrier wave (for example, transmission over Internet).

The display device described above is not limitedly applicable to the configuration and method of the above-described embodiments, and the embodiments are configured by selectively combining all or part of each of the embodiments such that various modifications can be made.

The invention claimed is:

1. A display device for providing a speech recognition service, the display device comprising:
   a display;
   a network interface configured to communicate with a server; and
   a controller configured to:
   receive a voice command uttered by a user; acquire usage information of the display device;
   transmit the voice command and the usage information of the display device to the server through the network interface;
   receive, from the server, an utterance intention based on the voice command and the usage information of the display device; and
   perform an operation corresponding to the received utterance intention,
   wherein the usage information of the display device comprises information on a usage environment of the display device used to determine the utterance intention of the voice command uttered by the user.

2. The display device of claim 1, wherein the controller control unit is configured to:
   receive a command for requesting the speech recognition service; and
   acquire the usage information of the display device at a time of receiving the command.

3. The display device of claim 1, wherein the usage information of the display device further comprises at least one of information on external devices connected through an external device interface of the display device, information on applications installed on the display device, information on interworking devices connected through a wireless communication unit provided in the display device, or channel information.

4. The display device of claim 3, wherein, when the utterance intention of the voice command is a conversion of an external input of the external device connected through the external device interface, the controller is configured to display an image input from the external device on the display.

5. The display device of claim 3, wherein, when the utterance intention of the voice command is an execution of the application installed on the display device, the controller is configured to display an execution screen of the installed application on the display.

6. The display device of claim 3, wherein, when the utterance intention of the voice command is a control of the interworking device connected through the wireless communication unit, the controller is configured to display an image transmitted from the interworking device on the display.

7. The display device of claim 3, wherein, when the utterance intention of the voice command is a channel switching, the controller is configured to perform the channel switching to a channel having a channel name included in the voice command.

8. The display device of claim 2, wherein the controller is configured to receive the voice command and the command for requesting the speech recognition service from a remote control device.

9. A method of operating a display device for providing a speech recognition service, the method comprising:
   receiving a voice command uttered by a user;
   acquiring usage information of the display device;
   transmitting the voice command and the usage information of the display device to a server;
   receiving, from the server, an utterance intention based on the voice command and the usage information of the display device; and
   performing an operation corresponding to the received utterance intention,
   wherein the usage information of the display device comprises information related to the display device used to determine the utterance intention of the voice command uttered by the user.

10. The method of claim 9, further comprising receiving a command for requesting the speech recognition service,
   wherein the acquiring of the usage information includes acquiring the usage information of the display device at a time of receiving the command.

11. The method of claim 9, wherein the usage information of the display device further comprises at least one of information on external devices connected through an external device interface of the display device, information on applications installed on the display device, information on interworking devices connected through a wireless communication unit provided in the display device, or channel information.

12. The method of claim 11, further comprising, when the utterance intention of the voice command is a conversion of an external input of the external device connected through the external device interface, displaying an image input from the external device.

13. The method of claim 11, further comprising, when the utterance intention of the voice command is an execution of the application installed on the display device, displaying an execution screen of the application installed.

14. The method of claim 11, further comprising, when the utterance intention of the voice command is a control of an interworking device connected through the wireless communication unit, displaying an image transmitted from an interworking device.

15. The display device of claim 11, further comprising, when the utterance intention of the voice command is a channel switching, performing the channel switching to a channel having a channel name included in the voice command.

\* \* \* \* \*